(12) United States Patent
Burger et al.

(10) Patent No.: US 7,372,180 B2
(45) Date of Patent: May 13, 2008

(54) ELECTRIC MOTOR WITH AN AIR DUCT

(75) Inventors: Helmut Burger, Moorenweis (DE);
Hansjoerg Schwarz, Kaufering (DE);
Peter Schmiddunser, Weil (DE);
Ernst-Rudolf Luebkert, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 630 days.

(21) Appl. No.: 10/964,324

(22) Filed: Oct. 13, 2004

(65) Prior Publication Data

US 2005/0089421 A1   Apr. 28, 2005

(30) Foreign Application Priority Data

Oct. 23, 2003   (DE) ................. 103 49 205

(51) Int. Cl.
*H02K 9/06*   (2006.01)
*H02K 5/20*   (2006.01)
(52) U.S. Cl. .................. 310/62; 310/60 R; 310/63
(58) Field of Classification Search .............. 310/62, 310/63, 58, 89, 60 R
See application file for complete search history.

(56) References Cited

U.S. PATENT DOCUMENTS

| | | | |
|---|---|---|---|
| 4,766,337 A * | 8/1988 | Parkinson et al. ........... 310/58 |
| 5,081,384 A * | 1/1992 | Rausch ...................... 310/63 |
| 5,311,089 A * | 5/1994 | Stroetgen et al. ............ 310/50 |
| 5,343,101 A * | 8/1994 | Matani ...................... 310/58 |
| 6,894,409 B2 * | 5/2005 | Bostwick et al. ............. 310/58 |
| 7,157,818 B2 * | 1/2007 | Jones ........................ 310/63 |

FOREIGN PATENT DOCUMENTS

| | | |
|---|---|---|
| DE | 4415915 | 6/1995 |
| EP | 1309074 | 5/2003 |
| GB | 0149284 | 3/1921 |

* cited by examiner

*Primary Examiner*—Burton Mullins
(74) *Attorney, Agent, or Firm*—Abelman, Frayne & Schwab

(57) ABSTRACT

An electric motor includes a stator (3) secured in the motor housing (2), a rotatable rotor (4), a fan impeller (5) arranged on the rotor (4), and an annular air duct (6) arranged between the fan impeller (5) and the rotor (4) and having a shroud (7) spaced from the impeller (5) by a slot having an axial width (X), a dimensionally stable, with respect to the shroud (7), housing stop (8), an axially, resiliently displaceable fixing element (9) forming a stator stop (10) facing in a same direction as the housing stop (8), and a locking element.

6 Claims, 1 Drawing Sheet

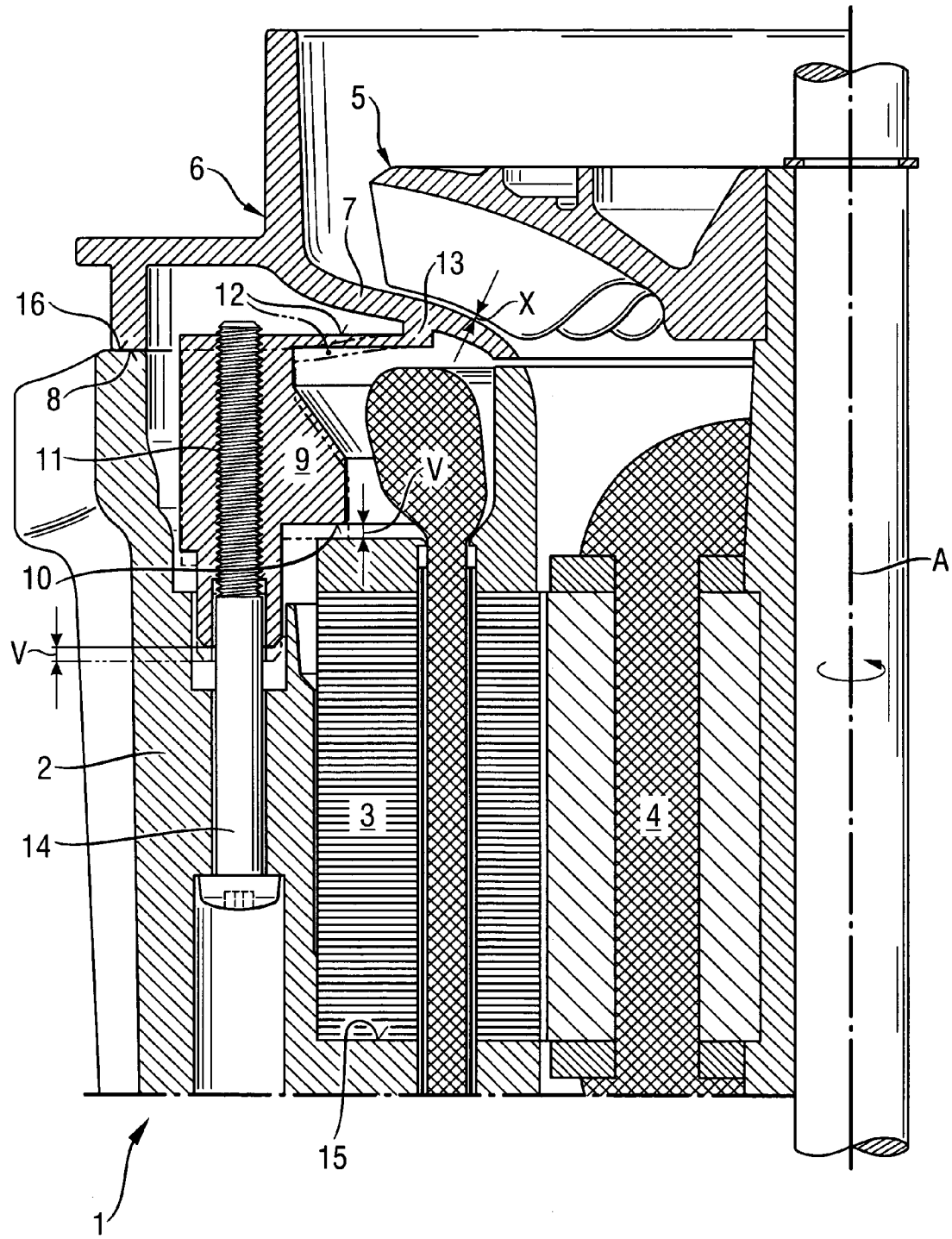

ELECTRIC MOTOR WITH AN AIR DUCT

BACKGROUND OF THE INVENTION

1. Field of the Invention

The present invention relates to an air-cooled electric motor, in particular, for a hand-held power tool, and having an air duct.

2. Description of the Prior Art

The stator of an electric motor is formed of stacked sheet metal lamellas in order to prevent any eddy current losses in an a.c. field. The necessary discrete number of lamellas results, upon assembly, to a discrete lengths, with a length tolerance of about 0.5 mm with a minimum one lamella.

For removal of heat, which is generated during operation of the electric motor, in compact electrical motors which are preferably used in hand-held power tools, a cooling air stream is directed through a gap between the stator and the rotor. The air stream is generated by a fan impeller mounted on the rotor shaft. In order to increase the efficiency, the fan impeller is movable in a suitably shaped, air duct with a shroud, whereby a critical, axially narrow gap for the fan impeller is maintained. Even smaller changes of +/−0.2 mm with a slot having a width of about 1 mm cause strong fluctuations of +/−50% of the generated air flow, which leads to different cooling characteristics within a tool series.

According to German Publication DE 42 20 078 A1, in front of the fan impeller, an annular air duct, which forms a foreground grid, is secured to the tool housing of a hand-held tool. The securing of a stator with the air duct cannot be carried out.

In U.S. Pat. No. 5,343,101, behind the fan impeller, an annular or ring-shaped air duct, which is formed of a plastic material, is secured to a rotor end shield with screws. The rotor end shield is secured in the tool housing and is provided with bushes each having an inner thread for a locking bolt for securing the stator. U.S. Pat. No. 5,343,101 does not disclose a freely projecting shroud having a pre-determined position relative to the impeller and arranged on one side of the impeller.

According to German Publication DE 26 17 860, a naturally stiff receiving ring, which functions as an annular air duct, is arranged in front of the impeller, with the receiving ring being secured to the tool housing and provided with bushes having an inner thread for looking bolts for securing the stator. Upon securing the stator using the rigid receiving ring, the stator axial tolerances result in the change of the critical axial width of the gap in front of the fan impeller.

Accordingly, an object of the present invention is an electric motor with an air duct which is arranged between the rotor and the fan impeller and which, in addition to functioning as means for securing the stator, provides for a gap in front of the impeller that does not depend from stator tolerances.

SUMMARY OF THE INVENTION

This and other objects of the present invention, which will become apparent hereinafter, are achieved by providing an electric motor including a housing, a stator secured in the housing a rotor rotatable about an axis, a fan impeller arranged on the rotor, an annular air duct arranged between the fan impeller and the rotor and having a shroud spaced from the impeller by a slot having an axial width, a dimensionally stable, with respect to the shroud housing stop, an axially resiliently displaceable fixing means forming a stator stop facing in a same direction as the housing stop, and locking means.

By separating fixing means with the stator stop, which serves for securing the stator in the housing, and the locking means from the housing stop, which serves for exact axial positioning of the air duct, the slot width becomes independent of the stator tolerances.

Advantageously, the shroud is formed rotationally symmetrical so that width remains constant during rotation of the impeller.

Advantageously, the resiliently displaceable fixing means is connected with the shroud by a leaf spring securable with one of its ends to a radially inwardly located, connection point. Thereby, with the air duct formed as a one-piece part, the radially outwardly located, axially resiliently displaceable, fixing means can be formed technologically easy.

Advantageously, the locking means is formed as an inner thread which extends parallel to the axis about which the rotor rotates and in which a locking bolt is screwed in for securing the stator from a side remote from the fan impeller.

Advantageously, there are provided two locking means which are, preferably, arranged diametrically opposite with respect to the rotor rotational axis. Thereby, the bending torque generated upon tightening of locking bolts for securing the stator in the housing is reduced.

The novel features of the present invention, which are considered as characteristic for the invention, are set forth in the appended claims. The invention itself, however, both as to its construction and its mode of operation, together with additional advantages and objects thereof, will be best understood from the following detailed description of a preferred embodiment, when read with reference to the accompanying drawings.

BRIEF DESCRIPTION OF THE DRAWINGS

In the Drawings:

Single FIGURE shows a cross-sectional view of an electric motor according to he present invention.

DETAILED DESCRIPTION OF THE PREFERRED EMBODIMENT

An air-cooled motor according to the present invention, which is shown in the drawing, includes a housing 2, a stator 3 secured in the housing 2, and a rotatable, about an axis A, rotor 4 on which a fan impeller 5 is arranged. Between the rotor 4 and the impeller 5, an annular air duct 6 with a rotationally symmetrical shroud 7 is arranged. The shroud 7 is spaced from the impeller 5 by a narrow slot having a width X. The one-piece air duct also forms a dimensionally stable housing stop 8 and an axially resiliently displaceable fixing means 9 that includes a stator stop 10 facing in the same direction as the housing stop 8. The fixing means 9 further has locking means in form of two inner threads 11 (of which only one thread is shown) for locking bolts 14 and which extend parallel to the axis A about which the rotor 3 rotates. A leaf spring 12, which is formed by the air duct 6, connects the fixing means 9 with the shroud 7 at a located radially inwardly, connection point 13. Two diametrically opposite locking bolts 14 (only one is being shown), which partially extend through the housing 2, are screwed into respective inner threads 11 from a side remote from the impeller 5, whereby the stator 3 is secured between the stator stop 10 and a stator counter-stop 15 free of bending stresses, as shown with dash-dot lines. The housing stop 8, which is provided on the air duct 6 and which abuts a duct stop 16 provided on the housing 2, provides for setting of a predetermined slot width X between the shroud 7 and the impeller 5 independently of an axial displacement V of the fixing means 9.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. An electric motor, comprising a housing (2); a stator (3) secured in the housing (2); a rotor (4) rotatable about an axis (A); a fan impeller (5) arranged on the rotor (4); an annular air duct (6) arranged between the fan impeller (5) and the rotor (4) and having a shroud (7) spaced from the impeller (5) by a slot having an axial width (X), a dimensionally stable, with respect to the shroud (7), housing stop (8), an axially, resiliently displaceable fixing means (9) forming a stator stop (10) facing in a same direction as the housing stop (8), and locking means, wherein the air duct (6) has a leaf spring (12) that connects the fixing means (9) with the shroud (7).

2. An electric motor according to claim 1, wherein the shroud (7) is rotationally symmetrical.

3. An electric motor according to claim 1, wherein the leaf spring (12) is connected with the shroud (7) at a located radially inwardly, connection point (13).

4. An electric motor according to claim 3, wherein the locking means is formed as an inner thread (11), which extends parallel to the axis (A) about which the rotor (4) rotates and in which a locking bolt (14) is screwed in.

5. An electric motor according to claim 1, wherein there are provided two locking means.

6. An electric motor according to claim 5, wherein the two locking means are arranged diametrically opposite each other with respect to the axis A.

* * * * *